United States Patent [19]

Minekawa et al.

[11] 4,121,031

[45] Oct. 17, 1978

[54] PROCESS FOR PRODUCING RANDOM COPOLYMERS

[76] Inventors: Saburo Minekawa; Sigeru Yonekawa; Haruro Tabata, all of Yokohama-shi, Kanagawa-ken; Takashi Ishida, Kamakura-shi, Kanagawa-ken; Satoshi Tsuchida, Yokohama-shi, Kanagawa-ken; Kiyoshi Yamada, Kawasaki-shi, Kanagawa-ken, all of Japan

[21] Appl. No.: 699,313

[22] Filed: Jun. 24, 1976

Related U.S. Application Data

[63] Continuation of Ser. No. 200,558, Nov. 19, 1971, abandoned, which is a continuation-in-part of Ser. No. 686,226, Nov. 28, 1967, abandoned.

[30] Foreign Application Priority Data

Dec. 9, 1966 [JP] Japan .................................. 41-80365

[51] Int. Cl.$^2$ ........................ C08F 4/48; C08F 236/10
[52] U.S. Cl. .................................... 526/173; 526/340
[58] Field of Search ......................................... 526/173

[56] References Cited

U.S. PATENT DOCUMENTS 3,558,575   1/1971   Kechler .............................. 526/173

Primary Examiner—William F. Hamrock
Attorney, Agent, or Firm—Flynn & Frishauf

[57] ABSTRACT

Process for producing a completely random copolymer of a conjugated diene and a monovinyl substituted aromatic compound having the same composition as that of the starting monomeric mixture which comprises copolymerizing a conjugated diene and a monovinyl substituted aromatic compound in the presence of lithium catalyst in a polymerization medium at a temperature not higher than 150° C and at which the resulting copolymer is substantially phase-separated, said temperature being dependent upon the type of medium, and type, composition and concentration of the monomer used.

12 Claims, 4 Drawing Figures

PROCESS FOR PRODUCING RANDOM COPOLYMERS

RELATED APPLICATIONS

This application is a continuation of our application Ser. No. 200,558, filed Nov. 19, 1971, which, in turn, is a continuation-in-part of Ser. No. 686,226, filed Nov. 28, 1967. Applications Nos. 220,558 and 686,226 have been abandoned.

FIELD OF THE INVENTION

This invention relates to a process for producing rubbery random copolymers.

DESCRIPTION OF THE PRIOR ART

It is well known that among the various copolymers consisting of two or more kinds of monomers, those copolymers in which these two or more monomers are uniformly distributed within the copolymer without being maldistributed are generally called "random copolymers", and those in which a certain kind of monomer is nonuniformly and successively distributed in a given copolymer molecule in a proportion larger than the average proportion of the monomer in the copolymer molecules as a whole are generally called "block copolymers".

It is also well known heretofore that in copolymerizing two or more kind of monomers, the apparent rate of reaction of a monomer differs from that of the other under the conventional reaction conditions. As a result, normally only a monomer having a faster rate of reaction is polymerized in the initial stage of the reaction to form a segment thereof, and then, another monomer having a slower rate of reaction is continuously copolymerized with said segment in the subsequent stage of the reaction to produce a copolymer, a so-called "block copolymer". A number of attempts have been devoted to obtain a random copolymer in one way or another, notwithstanding such general tendency.

The prior art processes for producing a random copolymer proposed heretofore can be generally classified into the following three groups:

(1) The processes in which the apparent rates of reaction of the both monomers used under given reaction conditions are equalized by altering the catalyst and the reaction conditions employed. In such processes, although the both monomers may be arranged in a random fashion, there is a disadvantage in that the microstructures of these monomers are changed and, as a result, the physical properties of the resulting copolymer are considerably degraded. These processes are disclosed in U.S. Pat. Nos. 2,975,160 (Zelinski) and 3,294,768 (Wofford).

(2) The processes developed by modifying the equipment or the reaction system to obtain a copolymer which may be regarded substantially as a random copolymer. For example, there have been known the processes in which a monomer having a faster rate of reaction is charged additionally stepwise at a feed rate which is in agreement with the rate of consumption of said monomer, to the reactor in which the polymerization reaction is conducted in case of a batch system, or, to a plurality of reactors connected in series in case of a continuous system. In fact, most of the processes now being adopted in the production of various random copolymers on a commercial scale fall under this category.

However, in such processes, it is practically impossible to feed the monomer in complete agreement with the rate of reaction of the monomer, i.e. the rate of consumption thereof, which varies continuously or stepwise depending upon the various reaction conditions, either in a batch or a continuous system. Thus, what can be done at best in actual practice is no more than charging the additional amounts of the monomer for several times at most before completion of the reaction. Accordingly, the respective monomers in the higher molecules of the resulting copolymer are by no means arranged in a completely random fashion, and thus, there is obtained only a copolymer in which the content of the monomer is varied in a saw-tooth pattern depending upon the times of the addition of the monomer, though there may be obtained a copolymer which can be regarded practically as a random copolymer.

(3) Alternatively, there has been an attempt to obtain a random copolymer in a batch system by charging to a polymerization zone containing a catalyst and a hydrocarbon diluent, a conjugated diene and a simultaneously a vinyl substituted aromatic hydrocarbon at a rate less than the normal polymerization rate of the system under the conditions employed.

However, as is well known in the polymerization of conjugated dienes by using a lithium based catalyst, the degree of polymerization of the resulting polymer is solely dependent upon the ratio of the amount of monomer to that of the catalyst. That is, in the continuous polymerization, it is always necessary to introduce the monomer continuously into the reaction system together with the catalyst in an extremely small amount which corresponds to a reciprocal of the desired degree of polymerization. Thus, it is self-evident that the process is not applicable to a commercial production of random copolymers.

In a batch system, since the degree of polymerization is dependent upon the ratio of amount of catalyst to that of the monomer which are charged to the reactor by the completion of the reaction, it is possible to conduct the reaction by charging a major amount of the catalyst to the reactor at the beginning of the reaction and then introducing the monomeric mixture gradually afterwards. However, in this instance, the reaction mixture becomes very viscous as the reaction proceeds, and the desired random copolymer may not be obtained by adjustment of the rate of introduction alone, no matter how elaborately the rate of introduction of the monomeric mixture to the viscous and concentrated solution is adjusted. This system is typically disclosed in U.S. Pat. No. 3,094,512 (Short).

On the other hand, the practice of a batch polymerization has been proposed at a temperature not lower than 310° F. (154° C.) and maintaining the coexistence of butadiene and styrene monomers during the reaction (U.S. Pat. No. 3,558,575 to N. F. Keckler). The object of this patent resides in decreasing the block content in the resulting copolymer by using such a high temperature than 310° F. whereby decreasing the difference of the rates of polymerization between the two monomers from which the copolymer is produced.

In this patent, the difference in the rates of reaction of the both monomers certainly diminishes, but the rates are not necessarily equalized with each other. Therefore, the block content can surely be decreased as compared with a polymerization conducted at an ordinary temperature, for example, at 110° F. But the block portion cannot completely be reduced to zero as in the present invention. In case of polymerizing, for example, a mixture comprising butadiene and styrene in the weight ratio of 85/15 at 350° F., the block styrene portion reaches 5.7% based on the weight of the whole copolymer.

It is a well known fact to those skilled in the art that very undesirable results such as the increase of heat build-up are produced in the physical properties of vulcanized products if the amount of block styrene exceeds 3% by weight based on the weight of the butadiene-styrene copolymer. Therefore, it has little value from a commercial point of view to diminish the block portion at a high temperature not lower than 310° F.

Moreover, the present inventors have found the fact that the amount of gel formation considerably increases so as to lose the commercial value of the copolymer and to cause not a little trouble to the apparatus in case of conducting a polymerization reaction particularly in a continuous system at a high temperature not lower than 150° C. as indicated in Example 5.

SUMMARY OF THE INVENTION

It is, therefore, an object of this invention to provide a unique process for producing random copolymers in which monomers are arranged uniformly, free from the drawbacks accompanied by the prior art processes.

In accordance with the present invention, the object mentioned above can now be accomplished by a process which comprises initiating a polymerization of a conjugated diene and a monovinyl substituted aromatic compound in the presence of a lithium based catalyst in a hydrocarbon solvent maintained at a temperature not greater than 150° C. and at which the resulting copolymer may be phase-separated from the polymerization solvent, controlling the reaction temperature within the above-mentioned specific range to complete the polymerization reaction. By employing such operating temperatures, the resulting copolymer separates from the reaction mixture to form a slurry and a slurry state is maintained. Substantially no gels are formed.

Now, the process of this invention will be explained in detail in conjunction with the accompanying drawing in the following.

We have conducted a thorough study in an attempt to find a process for producing a copolymer of conjugated dienes and monovinyl substituted aromatic compound having a completely random molecular arrangement. As a result, we have found that the viscosity of the resulting polymer solution is rapidly and discontinuously decreased as the temperature is raised beyond a certain specific level, which is dependent upon the reaction system such as the type of hydrocarbon solvent used and the composition of the contemplated copolymer, and the polymer solution becomes turbid showing so-called "phase separation" as indicated by the portion (A) in FIG. 1. The temperature should not be above 150° C.

The phenomenon, i.e. the phase separation, has been evaded in a solution polymerization for the reason that, under such circumstances, the polymerization reaction proceeds heterogeneously. However, it has been found that if the temperature is raised further beyond that point, there is a region in which the viscosity of the dispersion is not changed so rapidly as the temperature is raised as shown by the portion (B) in FIG. 1. Now, the specific temperature region mentioned above is defined as "a phase separated temperature region", i.e. a temperature region which is not above 150° C. and in which the resulting copolymer is substantially separated from the polymerization medium to form a slurry.

As indicated in Example 5, the specific temperature region is limited to not higher than 150° C., since the gel content of the produced copolymer considerably increases at higher temperatures so as to remarkably deteriorate the physical properties of the copolymer. It is well known to those skilled in the art that the increase of gel content in the copolymer leads to such disadvantages as degradation of miscibility of copolymer and other compositions, degradation of physical properties, e.g., tensile strength of vulcanized products and bad appearance of the products in the process for production vulcanized rubbers such as tyre tread in which a major utility of the copolymer of the present invention resides.

Figure 1:
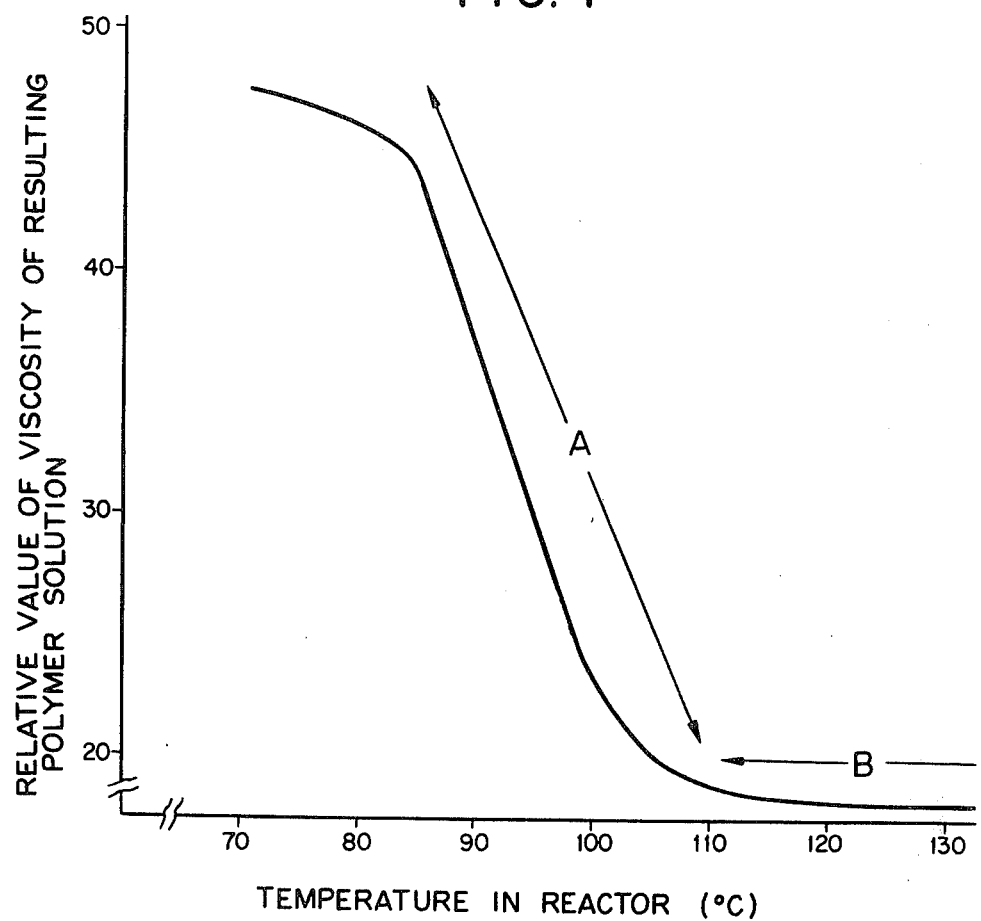
FIG. 1 shows a general relationship between the reaction temperature and the viscosity of the resulting polymer solution.

FIG. 1 was obtained in the production of a styrene/butadiene copolymer having a styrene content of 20% in a 25% n-hexane solution. In FIG. 1, the ordinate shows the relative value of viscosity of the polymer solution in the reactor and the abscissa shows the temperature in the reactor.

We have found that if conjugated dienes and monovinyl substituted aromatic compounds are copolymerized in the presence of a lithium based catalyst within the specific temperature region defined above, there is obtained a random copolymer having the same composition as that of the starting monomeric mixture quite easily. That is, so long as the copolymerization reaction is conducted in the specific temperature region, the apparent velocities of reaction of the both monomers are practically equalized and there can be produced a random copolymer continuously in a single reactor having a high agitation efficiency, without requiring a plurality of reactors connected in series as used in the continuous production of random copolymers on a commercial scale heretofore.

In a semi-batch system as well, if the reaction is conducted in the specific temperature region defined above, the random copolymers can be produced regardless of the rate of introduction of the monomers to the reaction system.

The specific temperature region defined above varies over a wide range depending upon the type of hydrocarbons used as a solvent.

In general, it is difficult to observe such a significant variation as shown in FIG. 1 in the temperature region of 70°-130° C. when aromatic hydrocarbons such as toluene, benzene and ethylbenzene, which are good solvents to the resulting copolymers, are used. In case of saturated aliphatic hydrocarbons such as decane, nonane, octane, heptane, hexane and pentane; and alicyclic hydrocarbons such as cyclohexane and methyl cyclohexane, there is observed a general tendency for the hydrocarbons having lesser carbon atoms to lower the temperature region in which the resulting copolymer is substantially phase-separated to form a slurry.

However, even when using a given hydrocarbon solvent, the phase separated temperature region thereof varies over a wide range depending upon the composition of the starting monomeric mixture, the concentration of the monomer in the solution, and the solid concentration in the resulting polymer solution. Thus, the phase separated temperature region must be determined by the procedures as in FIG. 1 depending upon the reaction conditions used case by case.

As an appendant but not the least important effect of the process of this invention, it is possible to perform an agitation of the reaction mixture at a high revolution with a small power as shown in the Examples hereinafter, since in the phase separated temperature region used in this invention, the viscosity of the reaction system is extremely low, i.e. practically the same as that of the mixture of the monomers and solvent as can be appreciated from the FIG. 1.

In the continuous polymerization on a commercial scale, unlike in batch system equipment which only deals with a small volume, it is necessary to remove the phase separated polymerization product continuously and uniformly from the reaction system. Thus, provision for a sufficient agitation is of great importance in this regard.

Furthermore, in accordance with the process of this invention, since a monomeric mixture of a fixed composition and a catalyst are simultaneously introduced into the reactor in a continuous manner to complete the polymerization reaction, the distribution of monomer segment in the resulting copolymer is completely at random as compared with the random copolymers obtained according to the prior art processes in which a certain kind of monomer is additionally fed stepwise. Thus, the random copolymers obtained in accordance with the process of this invention have a number of advantages when used for a type tread in which a major utility of the random copolymer contemplated in this invention resides, such as abrasion resistance and resistance to heat generation, in addition to uniformity in the physical properties.

The lithium catalysts which may be used in the process of this invention include, for example, metallic lithium, methyllithium, ethyllithium, propyllithium, butyllithium, amyllithium, hexyllithium, 2-ethylhexyllithium, phenyllithium, ethylenedilithium, trimethylenedilithium, pentamethylenedilithium, 1,4-dilithiobenzene, 1,5-dilithiobenzene, 1,5-dilithionaphthalene and the like.

Conjugated dienes which may be used in the process of this invention include 1,3-butadiene, isoprene, piperylene and the like.

Monovinyl substituted aromatic hydrocarbons which may be used in the process of this invention include styrene, α-methylstyrene, vinylnaphthalene and the like.

DESCRIPTION OF THE PREFERRED EMBODIMENTS

This invention will be explained more fully in the following Examples. It should not be construed, however, that these Examples restrict this invention as they are given merely by way of illustration:

EXAMPLE 1

To a reactor which was maintained at 130° C. was introduced a starting reactant mixture consisting of 5 parts by weight of styrene, 20 parts by weight of butadiene and 75 parts by weight of n-hexane, together with 5% n-hexane solution containing 0.014 part by weight of n-butyllithium, and the resulting polymer was removed continuously together with the solvent. As can be clearly noted from the FIG. 1, under the reaction conditions mentioned above, the polymer solution was in such a state that the resulting polymer was substantially separated from the polymerization medium to form a slurry, thus, the process of the instant Example is covered within the scope of this invention. The resulting copolymer was dried in a conventional procedure to yield a polymer designated sample A.

On the other hand, four reactors were connected in series and to the first reactor was introduced directly a starting reactant mixture consisting of 5 parts by weight of styrene, 5 parts by weight of butadiene and 30 parts by weight of n-hexane, together with 5% hexane solution containing 0.014 part by weight of n-butyllithium. To the second and the subsequent reactors were introduced a mixture consisting of 15 parts by weight of butadiene and 45 parts by weight of n-hexane portionwise at a rate corresponding to the rate of consumption of butadiene due to the polymerization thereof and there was obtained a butadiene/styrene copolymer. The temperatures of the respective reactors were in the range of about 60°–80° C.

As can be noted from the FIG. 1, the solution was a homogeneous and transparent solution and the foregoing procedures do not fall under the operating conditions specified in this invention. The foregoing is a typical process for producing random copolymers known heretofore. The resulting copolymer was designated sample B.

For further comparison, to a reactor which was maintained at 115° C. was introduced continuously a mixture consisting of 5 parts by weight of styrene, 20 parts by weight of butadiene and 75 parts by weight of toluene, together with 5% n-hexane solution containing 0.014 part by weight of n-butyllithium, and the resulting copolymer was removed continuously together with the solvent.

Figure 3:
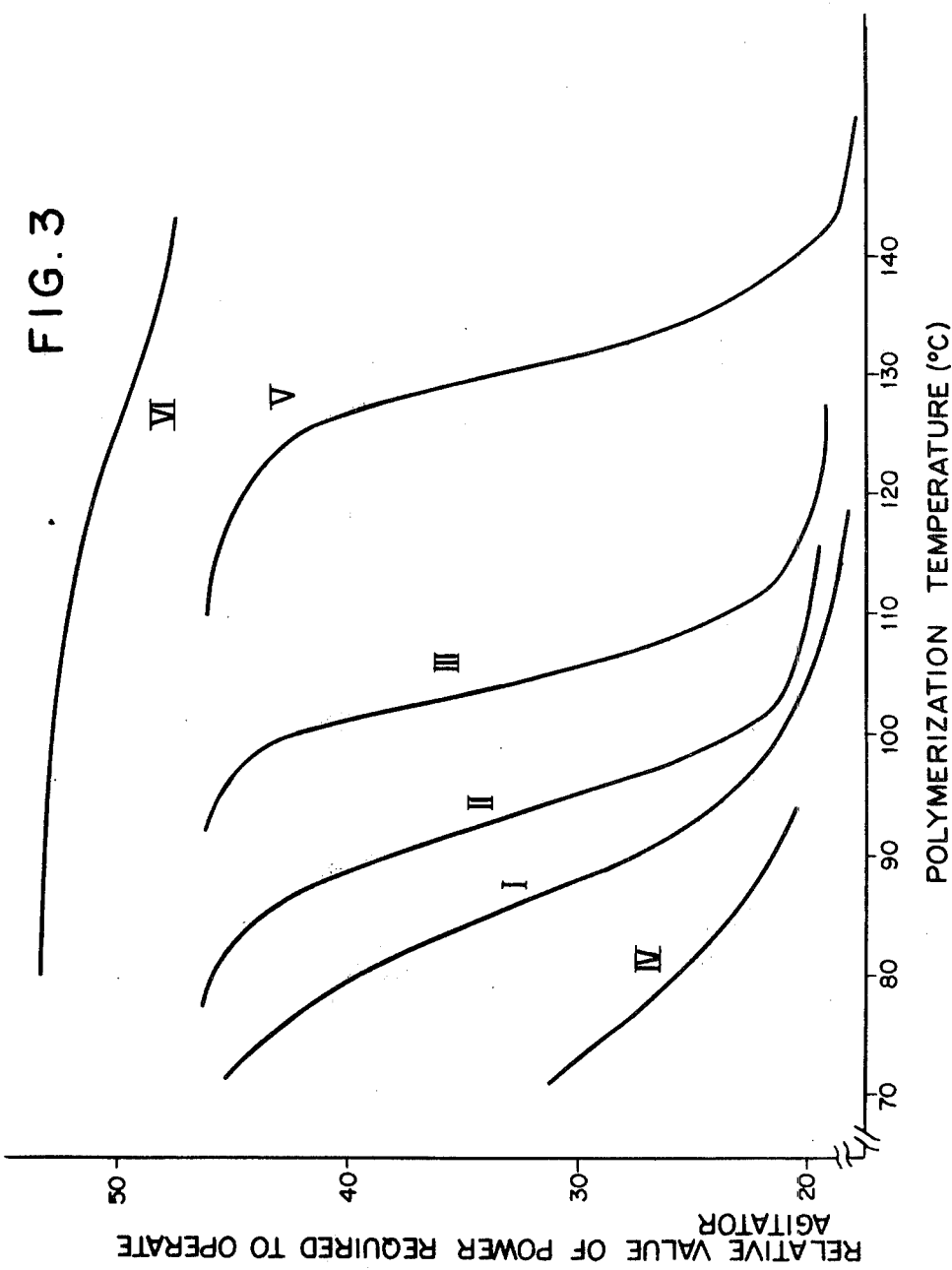
FIG. 3 shows the relationship between the power required to agitate the resulting polymer solution and the operating temperature in producing various copolymers in various solvents.

As can be noted from the FIG. 3 given in Example 4, the phase was not separated in this system at all and it was in a state of a true solution. The resulting copolymer was dried by a conventional procedure to yield a copolymer designated sample C.

The conversions and the results of analysis of the resulting copolymers are shown in the following Table 1:

Table 1

| Item Samples | A | B | C |
|---|---|---|---|
| Conversion of styrene (%)[1] | 96.8 | 97.2 | 98.0 |
| Conversion of butadiene (%)[1] | 99.9 | 99.8 | 99.9 |
| Bound styrene in sample (%)[2] | 19.5 | 19.8 | 20.1 |
| Block styrene in sample (%)[3] | — | — | 10.2 |
| 1,2-vinyl group in butadiene portion (%)[1] | 11.2 | 11.1 | 10.9 |
| Mooney viscosity (ML$_{1+4}$)[4] | 45 | 43 | 48 |

[1] Determined by an infrared spectrography.
[2] Determined by the refractive index.
[3] Determined by an oxidative decomposition using di-tert-butylhydroperoxide and osmium tetroxide.
[4] Measured according to JIS-K-6300.

Table 1 clearly shows that sample A obtained by the process of this invention as well as sample B obtained by the known process are random copolymers. However, it shows that sample C contains a large amount of block styrene. The polymer solution in the preparation of sample C was a homogeneous and transparent solution in which no phase separation took place and it does not fall under the scope of this invention. Obviously, there was no difference at all among these three samples with regard to the 1,2-vinyl linkage in the butadiene portion.

Figure 2:
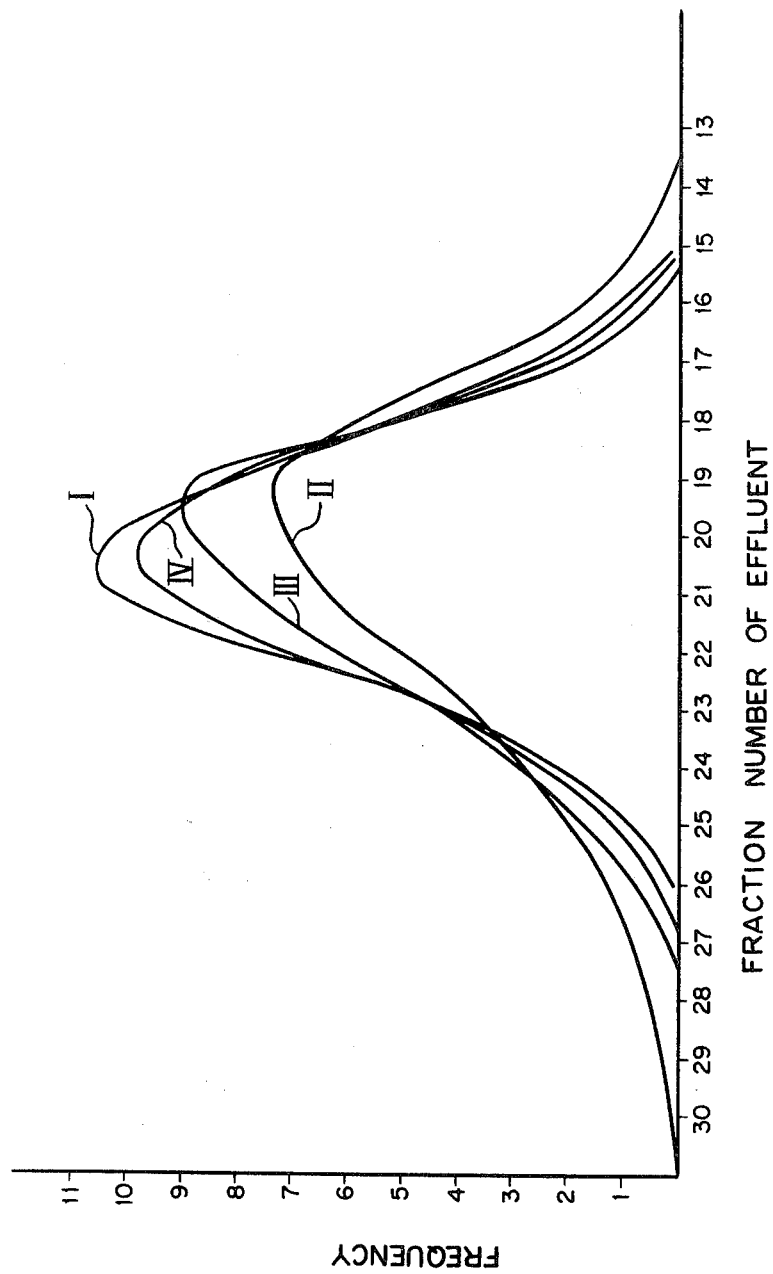
FIG. 2 illustrates the distribution of molecular weight in the random copolymers produced in various processes.

The molecular weight distributions of samples A and B were determined by a Gel Permeation Chromatography and the results are shown in FIG. 2.

In FIG. 2, the curve I shows the molecular weight distribution of the sample A and the curve II shows that of the sample B. As can be clearly noted from FIG. 2, sample A has a relatively narrow molecular weight distribution, whereas sample B has a wide distribution as shown by the gentle slope extending over the low molecular weight side, and moreover, the peak is shifting to the higher molecular weight side. This is a phenomenon observed as a result of the deactivation of active high molecules due to the additional feed of the monomers to a plurality of reactors. It is well known that the low molecular weight portions adversely affect the physical properties of the copolymer.

The styrene content of the copolymer contained in the effluent from the Gel Permeation Chromatography used to give the diagram of FIG. 2 was measured according to an infrared spectrography.

The results are shown in the following Table 2:

Table 2

| Effluent fraction Nos. | 13–15 | 16–17 | 18–19 | 20–21 | 22–23 | 24–26 | 27–30 |
|---|---|---|---|---|---|---|---|
| Styrene content in sample A (%) | — | 19.9 | 19.8 | 19.9 | 20.1 | 19.6 | — |
| Styrene content in sample B (%) | 15.1 | 17.8 | 19.3 | 20.1 | 21.7 | 21.1 | 22.9 |

From the Table 2 shown above, it can be noted that sample B obtained according to the conventional process known heretofore has a wide molecular weight distribution, and in addition, the styrene content varies considerably in accordance with the molecular weight. Thus, sample B cannot be regarded as a uniform random copolymer in that sense.

Samples A and B were then compounded according to a recipe shown in Table 3, milled at 60° C. by using a 8 inch open roll, respectively, and vulcanized in a hot-press at 140° C. for 30 minutes to give the respective vulcanized rubbers.

The following Table 4 shows the results of measurement of the physical properties of the resulting vulcanized rubbers:

Table 3

| Recipe | Parts by weight |
|---|---|
| Copolymer | 100 |
| HAF carbon black | 60 |
| Aromatic process oil | 20 |
| Stearic acid | 2.3 |
| Zinc oxide | 1.2 |
| Antioxidant D* | 1.2 |
| Vulcanization accelerator CZ** | 1.2 |
| Sulfur | 1.9 |
| Total: | 187.8 parts by weight |

*Trade name, phenyl-β-naphthylamine.
**Trade name, N-cyclohexyl-benzothiazylsulfenamide.

Table 4

| Item    Samples | A | B | C |
|---|---|---|---|
| Unvulcanized physical properties | | | |
| Mooney viscosity (ML$_{1+4}$)[1] | 60 | 58 | 65 |
| Mooney scorch time (Ms,t$_5$)[1] | 42 | 45 | 60 |
| Vulcanized physical properties | | | |
| Hardness (Hs,JIS)[2] | 63 | 61 | 67 |
| Tensile strength (Kg/cm$^2$)[2] | 210 | 200 | 170 |
| Elongation (%)[2] | 570 | 550 | 340 |
| 300% tensile modulus (Kg/cm$^2$)[2] | 83 | 75 | 95 |
| Tear resistance (Kg/cm)[2] | 55 | 42 | 40 |
| Resilience by RUPKE resilience tester[2] | 55 | 54 | 45 |
| Akron abrasion (cc/1000 times)[3] | 0.18 | 0.25 | 0.40 |
| Heat build up by Goodrich flexometer[4] (° C) | 17 | 24 | 35 |

[1]According to JIS-K-6300.
[2]According to JIS-K-6301.
[3]According to British Standards 903. Rotation 133 rpm., Slipping angle 15°, Load 4.5 Kg.
[4]According to ASTM D-623-58.

It is clear from the Table 4 that sample C which contains a large amount of block styrene is inferior to samples A and B with respect to the various physical properties such as resilience, abrasion resistance, resistance to heat generation and elongation.

Although at a glance samples A and B appear to have quite close physical properties, if studied carefully, it is clear that sample B is inferior to the sample A with regard to abrasion resistance which is the most important property of all when the copolymer is used for a tyre tread for which a major use of the copolymer according to this invention is contemplated, and this constitutes a fatal drawback of sample B. It is presumed that the low molecular weight portion of the sample B has this adverse effect.

It has been made clear from the foregoing that the physical properties of the copolymer obtained according to this invention are superior to the copolymers obtained in the prior art processes known heretofore.

EXAMPLE 2

To a reactor charged with 100 parts by weight of cyclohexane heated at 150° C. was added 0.07 part by weight of n-butyllithium beforehand, and there was introduced a starting mixture consisting of 20 parts by weight of styrene, 80 parts by weight of butadiene and 200 parts by weight of cyclohexane. After the completion of the introduction, the resulting copolymer was dried in a conventional method to give a copolymer designated sample A.

On the other hand, to a reactor charged with 100 parts by weight of cyclohexane heated at 140° C. was introduced a starting mixture consisting of 20 parts by weight of styrene, 80 parts by weight of butadiene and 200 parts by weight of cyclohexane at a constant rate, and simultaneously, there was introduced n-butyllithium in the form of a 5% n-hexane solution at such a rate that the amount of n-butyllithium was 0.07 part by weight per 100 parts by weight of the monomers introduced thereinto. After the completion of the introduction, the resulting copolymer was dried in a conventional method to give a copolymer designated sample B.

In both of the foregoing two operations, the state of the polymer solution was in the form of slurry in which the resulting copolymer was completely separated from the polymerization medium.

For comparison, to a reactor charged with 100 parts by weight of cyclohexane heated at 110° C. was added 0.07 part by weight of n-butyllithium beforehand, and there was introduced a starting mixture consisting of 20 parts by weight of styrene, 80 parts by weight of butadiene and 200 parts by weight of cyclohexane. After the completion of the introduction, the resulting copolymer was dried in a conventional method to give a copolymer designated sample C. The polymer solution was a homogeneous and transparent solution. The polymerization conditions employed in the preparation of samples A and B fall under the scope of this invention, whereas those used in the preparation of sample C are outside the present invention.

The conversions and the results of the analysis of the resulting copolymers are shown in the following Table 5:

Table 5

| Item Sample | A | B | C |
|---|---|---|---|
| Conversion of sytrene (%) | 99.3 | 99.4 | 98.0 |
| Conversion of butadiene (%) | 99.9 | 99.7 | 99.0 |
| Bound styrene in the sample (%) | 20.1 | 20.2 | 19.7 |
| Block styrene in the sample (%) | — | — | 10.3 |

Note) The method of analysis was in accordance with that of Table 1.

As can be noted from the Table 5, in accordance with the process of this invention, the random copolymers containing no styrene block at all can be obtained either by charging the catalyst to the reactor beforehand, or by charging the same together with the monomeric mixture. On the contrary, when the polymerization reaction is conducted at such a low temperature that the resulting copolymer is not separated from the polymerization medium, a large amount of block styrene is formed in the resulting copolymer molecules.

In FIG. 2, the curve III shows the molecular weight distribution of sample A obtained in the instant Example, and the curve IV shows that of sample B. It is clear that both of them have quite narrow molecular weight distribution, though sample A shows a slightly wider distribution somewhat extending over the low molecular weight side.

The samples A and B were subjected to the Gel Permeation Chromatography, but sample C was omitted.

The samples A, B and C were compounded according to the recipe shown in Table 3 given in the preceding Example 1, milled at 60° C. with a 8 inch open roll and vulcanized at 140° C. for 30 minutes with a hot-press to give vulcanized rubbers, respectively. The physical properties of the resulting vulcanized rubbers were measured and the results are shown in the following Table 6:

Table 6

| Item Samples | A | B | C |
|---|---|---|---|
| Unvulcanized physical properties | | | |
| Mooney viscosity ($ML_{1+4}$) | 62 | 59 | 65 |
| Mooney scorch time ($Ms$, $t_5$) | 38 | 43 | 62 |
| Vulcanized physical properties | | | |
| Hardness (Hs) | 62 | 64 | 70 |
| Tensile strength (Kg/cm$^2$) | 215 | 207 | 190 |
| Elongation (%) | 540 | 590 | 410 |
| 300% tensile modulus (Kg/cm$^2$) | 85 | 90 | 103 |
| Tear resistance (Kg/cm) | 57 | 53 | 55 |
| Resilience by RUPKE resilience tester (%) | 56 | 55 | 42 |
| Akron abrasion (cc/1000 times) | 0.20 | 0.18 | 0.51 |

Table 6-continued

| Item Samples | A | B | C |
|---|---|---|---|
| Heat build up by Goodrich flexometer (° C) | 18 | 16 | 28 |

Note) Methods of measuring were in accordance with those of the Table 4.

It can be noted from Table 6 that samples A and B obtained by copolymerization at a temperature at which the resulting copolymer was substantially separated from the polymerization medium according to the process of this invention, show quite excellent physical properties; whereas, sample C obtained by the copolymerization at a temperature at which no phase separation defined in this invention took place, is accompanied by the drawbacks of a block copolymer with regard to physical properties.

EXAMPLE 3

Three butadiene/styrene random copolymers having various styrene contents were prepared, respectively, according to the process of this invention.

More specifically, to a reactor maintained at 125° C. was charged 25% n-hexane solution containing a monomeric mixture having various styrene contents, together with 0.07 part by weight of n-butyllithium per 100 parts by weight of the monomer. Three different styrene contents of 10%, 20% and 40% were used for the monomeric mixture. The copolymers removed from the reactor were dried in a conventional method to yield the corresponding product copolymer. The state of the polymer solutions was in the form of stable slurry in which the phase separation was completed. The results of analysis are shown in the following Table 7:

Table 7

| | Styrene content | | |
|---|---|---|---|
| | 10% | 20% | 40% |
| Bound styrene in the resulting copolymer (%) | 10.5 | 19.7 | 40.9 |
| Block styrene in the resulting copolymer (%) | 0 | 0 | 0 |
| Conversion of styrne (%) | 98.9 | 97.0 | 99.2 |
| Conversion of butadiene (%) | 100 | 99.9 | 100 |

Note) The method of analysis was in accordance with Table 1.

The above-shown Table 7 clearly shows that the random copolymers can be obtained quite easily according to the process of this invention, irrespective of the styrene content of the starting monomeric mixture.

EXAMPLE 4

The conditions of the polymer solutions in the production of styrene/butadiene copolymers using various solvents were carefully observed.

To a reactor were charged a 25% solution of monomeric mixtures having a predetermined composition in various types of solvents specified in the following Table 8 together with a 5% n-hexane solution of n-butyllithium containing 0.07 part by weight of n-butyllithium per 100 parts by weight of the monomers, and the power required to operate the agitator of the reactor was recorded while changing the polymerization temperature. The results are shown in FIG. 3. The designation of the numerals for those curves shown in the FIG. 3 are as indicated in the following Table 8. In carrying out the experiments, the pressure of the reaction system was, of course, maintained higher than the vapor pressure of the solvents employed.

Table 8

| Curves in Fig. 3 | Styrene content in the starting monomeric mixture | Type of solvent |
|---|---|---|
| I | 40 | n-hexane |
| II | 20 | " |
| III | 10 | " |
| IV | 20 | n-pentane |
| V | 20 | cyclohexane |
| VI | 20 | toluene |

In FIG. 3, the ordinate does not show the viscosity of the polymer solution, but shows the relative value in terms of the power required for the agitation of the polymer solution, since it is quite difficult to measure the viscosity of the active polymer solution.

It can be noted from FIG. 3 that the viscosity begins to decrease rapidly at a certain point as the temperature is raised and continues to decrease rapidly until a certain higher temperature is reached and then, maintains about a flat level at higher temperatures beyond the point up to which the viscosity continues to decrease. An observation of the status of the reaction mixture in the course of polymerization through a sight glass of the reactor showed that the polymer solution which was transparent at the beginning of the reaction became slightly turbid at the temperature at which a rapid decrease in the viscosity began to prevail, and when the temperature was further raised, there was an unstable state under which a part of the solvent was separated to form a viscous and turbid liquid, and then, the solution turned to a complete slurry at the time when the temperature reached the point at which the rapid decrease in the viscosity ceased to exist.

The phenomenon observed as above was realizable with a good reproducibility once the composition of the copolymer contemplated, the amount and concentration of the catalyst used, the type of the solvent used are given.

It is also noted from FIG. 3 that even if the same 25% n-hexane solutions are used, the higher the styrene content in the resulting copolymer, the lower the temperature at which the polymer solution turns to a slurry. Moreover, when n-pentane was used as a solvent, the turning of the polymer solution to a slurry occurred at a lower temperature as compared with the use of n-hexane.

Toluene has an extremely high solubility for the polymer and it invariably gives a homogeneous and transparent solution within the temperature range investigated, thus, no phase separation was observed. In this regard, it is readily appreciated that toluene is a solvent difficulty used in the process of this invention.

The concentration of the resulting copolymer in the polymer solution, of course, affects the temperature at which the phase separation is completely effected.

Since it is generally impossible to predict the temperature at which a stable slurry is obtained in a given combination of the copolymer contemplated, the type of solvent, and the concentration of the polymer, it is necessary to conduct a preliminary experiment as described in the instant Example beforehand in order to determine the most preferable reaction conditions and variables when the production of the random copolymers is desired in accordance with the process of this invention.

EXAMPLE 5

Figure 4:
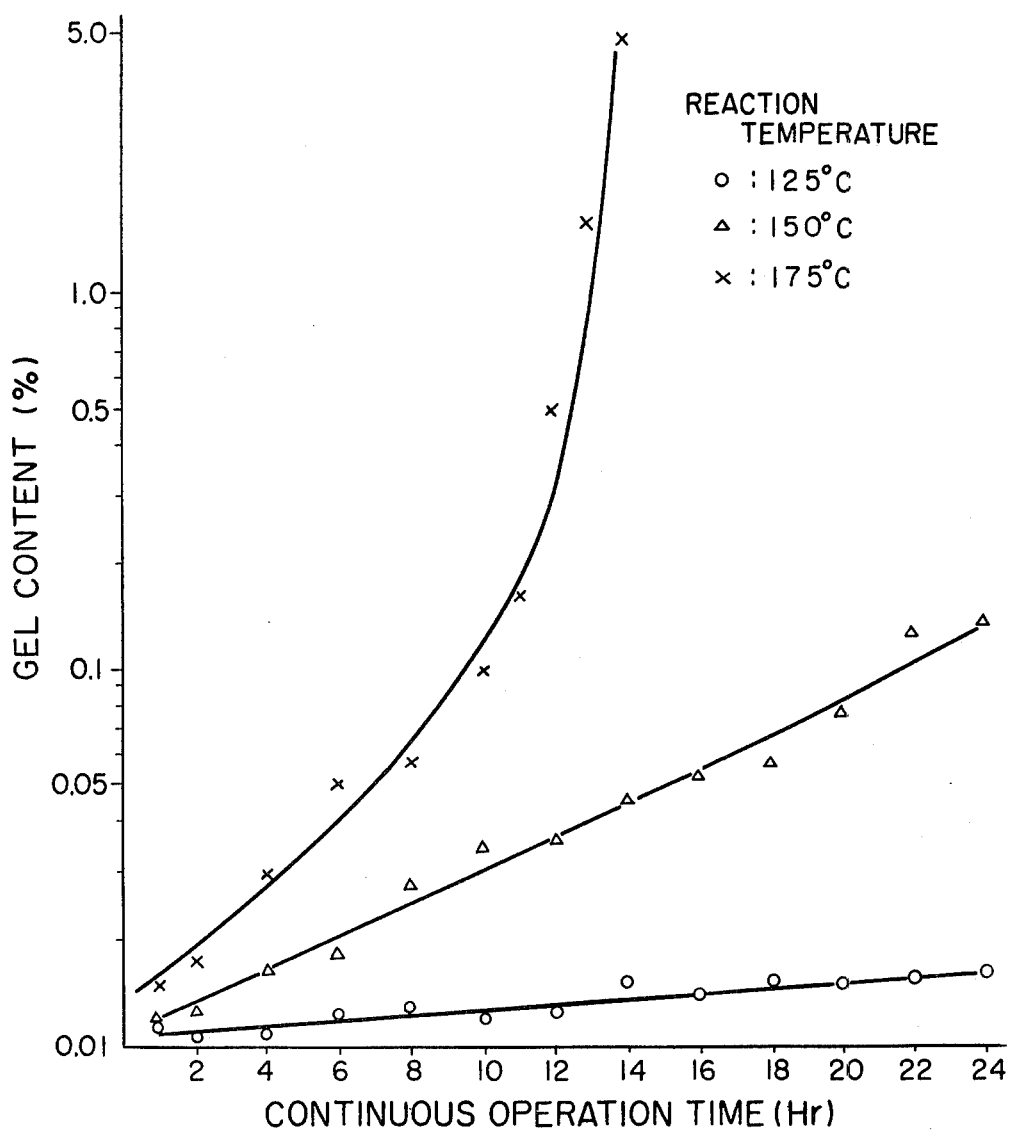
FIG. 4 represents comparative tests conducted at 125° C., 150° C. and 175° C., showing gel content in the copolymers prepared.

A continuous test for polymerizing styrene and butadiene was conducted for 24 hours under the following three polymerization conditions by using a 10 liter reactor provided with an agitator and a jacket. The amounts of gel formed were measured and the results obtained are shown in FIG. 4.

That is, to the reactors which were respectively maintained at 125° C., 150° C. and 175° C., were introduced continuously a monomeric mixture comprising 5 parts by weight of styrene and 20 parts by weight of butadiene, and hexane together with 0.07 part by weight of n-butyllithium per 100 parts by weight of the monomers introduced thereinto, and the continuous polymerizations were carried out while maintaining the polymerization temperatures of 125° C., 150° C. and 175° C.

In order to control the polymerization temperatures, there were provided a heat exchanger for the starting monomeric mixture and a reactor jacket in which respectively cold water and steam were circulated.

The polymerization reactions were all conducted at the conversion of not less than 98.0%. The gel contents in the resulting polymer solutions were measured at regular intervals. The results are shown in FIG. 4. As can be noted from the Figure, the critical upper temperature limit for practicing the reaction is about 150° C. The reaction conducted at a temperature above such temperature region may be experimentally significant, but it is impracticable as an industrial process.

The gel content % as shown in FIG. 4 represents the percentage by weight of residue which was left after the resulting polymer was dissolved in a toluene solvent and filtered through a sieve of 200 mesh.

As shown in FIG. 4, copolymers produced at temperatures above 150° C., and particularly at 175° C., contain an insoluble long chain, a network macropolymer or a cross-linked macropolymer which is conventionally referred to as a "gel". When such a gel-containing copolymer is used for a tyre tread, the miscibility and dispersibility of the composition in the processing process is degraded, thus providing as a final product a defective tyre of short life having a tendency to readily cause tread separation.

What is claimed is:

1. In the process for producing a substantially random copolymer by contacting 1,3-butadiene and styrene in the presence of a catalyst consisting of an alkyllithium in a hydrocarbon solvent to form said copolymer,
the improvement which comprises
charging simultaneously to a reactor a reactor charge consisting of said butadiene, styrene and n-butyllithium catalyst, and n-hexane solvent, or charging simultaneously said butadiene, styrene and n-hexane solvent to n-butyllithium catalyst in a reactor, the concentration of styrene and butadiene being from about 25 to about 33 percent by weight, the styrene/butadiene ratio being from 1/10 to 4/10, and in the process maintaining the resulting reaction mixture at a temperature not higher than 150° C. and above about 100° C. when the styrene/butadiene ratio is 4/10 and above about 110° C. when the styrene/butadiene ratio is 1/10, at which temperature the viscous solution of the resulting copolymer separates from said reaction mixture to form a slurry.

2. The process of claim 1, wherein the resulting reaction mixture is maintained in the process at about 125° C.

3. The process of claim 1, wherein the ratio of styrene/butadiene is ¼ and the resulting reaction mixture is maintained in the process at about 125° C.

4. The process of claim 1, wherein the ratio of styrene/butadiene is ¼ and the resulting reaction mixture is maintained in the process at 150° C.

5. The process of claim 1, wherein the ratio of styrene/butadiene is ¼ and the resulting reaction mixture is maintained in the process at about 130° C.

6. In the process for producing a substantially random copolymer by contacting 1,3-butadiene and styrene in the presence of a catalyst consisting of an alkyllithium in a hydrocarbon solvent to form said copolymer, the improvement which comprises charging simultaneously to a reactor a reactor charge consisting of said butadiene, styrene and cyclohexane solvent to n-butyllithium in a reactor, the concentration of styrene and butadiene being from about 25 to about 33 percent by weight, the styrene/butadiene ratio being about ¼, and in the process maintaining the resulting reaction mixture at 150° C., at which temperature the viscous solution of the resulting copolymer separates from said reaction mixture to form a slurry.

7. In the process for producing a substantially random copolymer by contacting 1,3-butadiene and styrene in the presence of a catalyst consisting of an alkyllithium in a hydrocarbon solvent to form said copolymer, the improvement which comprises charging simultaneously to a reactor a reactor charge consisting of said butadiene, styrene and n-butyllithium, and cyclohexane solvent, the styrene/butadiene ratio being from 1/10 to 4/10, the concentration of styrene and butadiene being from about 25 to about 33 percent by weight, and in the process maintaining the resulting reaction mixture at about 140° C., at which temperature the viscous solution of the resulting copolymer separates from said reaction mixture to form a slurry.

8. The process of claim 1, wherein the concentration of styrene and butadiene is about 25 percent by weight.

9. The process of claim 6, wherein the concentration of styrene and butadiene is about 25 percent by weight.

10. The process of claim 7, wherein the concentration of styrene and butadiene is about 25 percent by weight.

11. The process of claim 6, wherein the concentration of styrene and butadiene is about 33 percent by weight.

12. The process of claim 7, wherein the concentration of styrene and butadiene is about 33 percent by weight.

* * * * *